Figure 1:
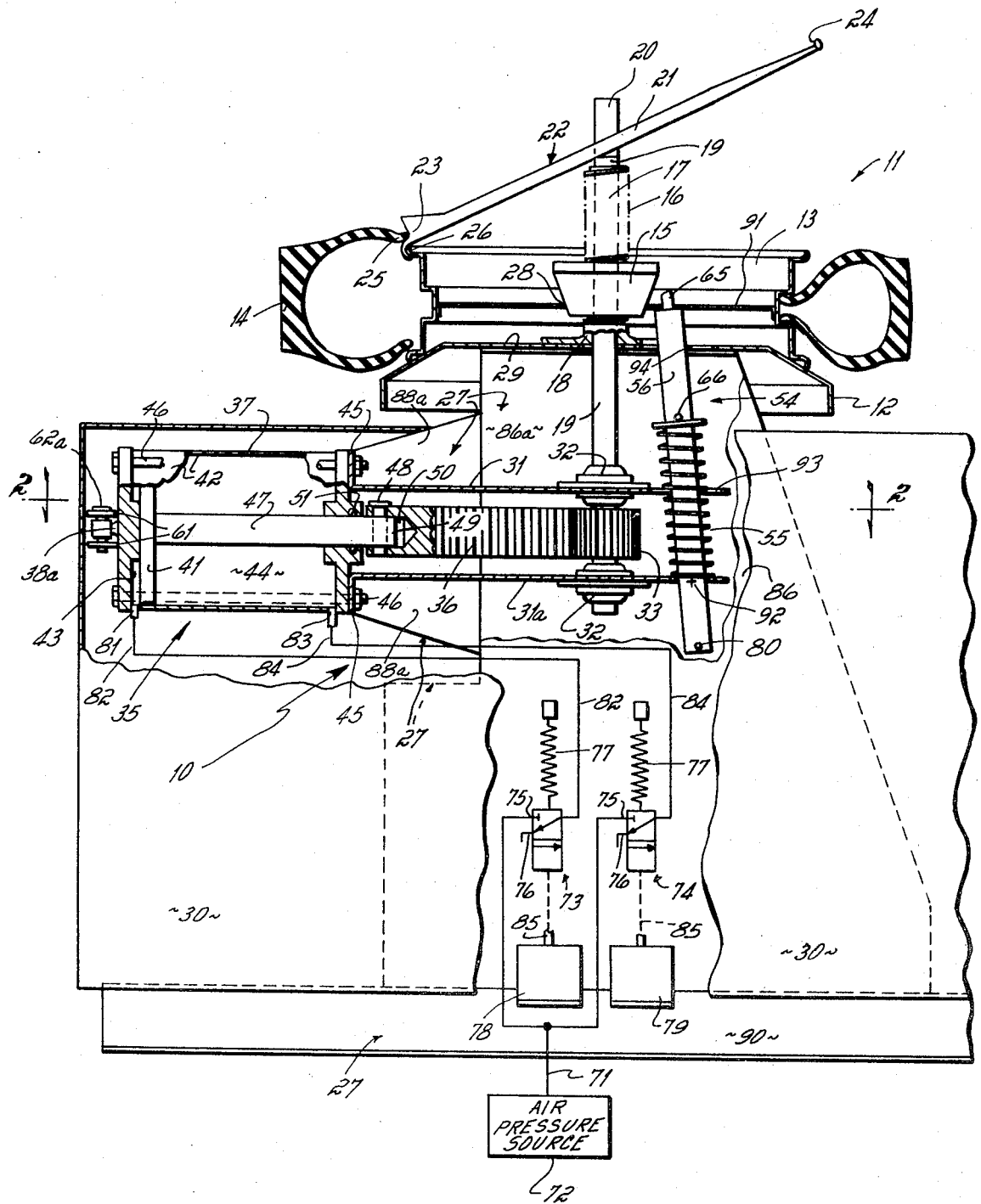

United States Patent [19]

Brosene, Jr.

[11] 3,847,198
[45] Nov. 12, 1974

[54] CENTERPOST DRIVE MECHANISM

[75] Inventor: William G. Brosene, Jr., Cincinnati, Ohio

[73] Assignee: Magnum Automotive Equipment, Inc., Cincinnati, Ohio

[22] Filed: Jan. 30, 1973

[21] Appl. No.: 328,016

[52] U.S. Cl. .............................................. 157/1.24
[51] Int. Cl. .......................................... B60c 25/06
[58] Field of Search ....... 157/1.17, 1.22, 1.24, 1.26, 157/1.28; 91/462

[56] References Cited
UNITED STATES PATENTS

| | | | |
|---|---|---|---|
| 840,082 | 1/1907 | Miller | 91/462 |
| 3,165,142 | 1/1965 | Tabordon | 157/1.17 |
| 3,489,198 | 1/1970 | Malinski | 157/1.17 |
| 3,581,796 | 6/1971 | Alm | 157/1.28 |
| 3,742,999 | 7/1973 | Myers, Jr. | 157/1.24 X |

*Primary Examiner*—Al Lawrence Smith
*Assistant Examiner*—Harold P. Smith, Jr.
*Attorney, Agent, or Firm*—Wood, Herron & Evans

[57] ABSTRACT

A centerpost drive mechanism for use in an automatic tire changer machine, the mechanism being adapted to rotate a tire mount/demount tool to aid in mounting a tire onto and demounting a tire from a wheel. The drive mechanism includes a rotatable centerpost that extends vertically upward through the machine's horizontally disposed wheel support table, the centerpost mounting a pinion beneath the table that is interengaged with a linear rack. The rack is transversely oriented relative to the centerpost and is directly connected with a fluid power unit, the power unit being adapted to drive the rack in both forward and reverse directions, thereby positively driving the centerpost in both clockwise and counterclockwise directions. At least one shock absorber is interconnected between a fixed location and the rack, the shock absorber functioning to at least partially control the rate of rotational motion for the centerpost (when extending the rack as well as when retracting the rack) regardless of the work load on the power unit. The drive rack/power unit/shock absorber combination is provided in modular form so that a new such unit may be easily replaced for an inoperative unit in the automatic tire changer machine without the use of skilled labor.

7 Claims, 2 Drawing Figures

CENTERPOST DRIVE MECHANISM

This invention relates to automatic tire changer machines. More particularly, this invention relates to an improved centerpost drive mechanism for an automatic tire changer machine.

The mounting of a pneumatic tire on a wheel, and the demounting of a pneumatic tire from a wheel, used to be done totally by hand. Such provided major problems for an operator in that a pneumatic tire's beads are relatively inflexible. In mounting a tire on a wheel, the tire's beads must somehow be disposed over the wheel's rim into the wheel's well area so as to positively locate the tire on the wheel. In demounting the tire from the wheel, the tire's beads must be somehow removed from the wheel's well area over the wheel's rim so that the tire is free of the wheel. Thus, the main objective of an automatic tire changer machine is to aid an operator in demounting a worn pneumatic tire from a wheel, and to aid an operator in mounting a new pneumatic tire onto a wheel.

Over the years, a number of different types of automatic tire changing machhines have been developed which provide means to mechanically assist an operator in mounting a tire on, and demounting a tire from, a wheel. Generally speaking, the major structural components of an automatic tire changer machine include a horizontally disposed table on which the wheel is initially positioned, an automatically rotatable centerpost that extends up from the table through the center of the wheel, and a mount/demount tool that functions to lift an old tire's beads over the rim off the wheel when the old tire is being demounted and to position a new tire's beads over the rim onto the wheel when the new tire is being mounted. The mount/demount tool is interconnected with the centerpost, and is mechanically rotated relative to the wheel by a power unit through that interconnection, to aid an operator in performing the tire mounting and demounting functions.

In mounting a tire on a wheel, the tire tool (the mounting head of which cooperates with the wheel's rim and the tire's bead to aid in locating the bead within the wheel's well area) is cooperatively engaged with the centerpost. The tire tool extends outward from the centerpost in a radial fashion, the centerpost in effect providing a vertical axis about which the tire tool is rotated for a single revolution, as well as providing the drive means to work the tool's mounting head around the bead to locate the bead over the wheel's rim. Of course, a suitable power unit must be drivingly connected with the centerpost so that same can be mechanically rotated about its vertical axis.

In demounting a tire from a wheel, the tire tool (the demounting head of which cooperates with the tire's beads to aid in lifting the beads out of the wheel's well area and over the rim so as to free the tire from the wheel) is also cooperatively engaged with the centerpost. The tire tool likewise extends outward from the centerpost in a radial fashion, the centerpost again providing the vertical rotational axis for the tire tool as the tool's demounting head is worked around the bead to lift the bead over the wheel's rim and off the wheel. The same power unit is employed to rotate the centerpost whether the tool's mounting head or demounting head is cooperatively engaged with the wheel.

However, automatic tire changing machines now known to the prior art have centerpost drive mechanisms which, generally speaking, are adapted to rotate the centerpost in one direction only relative to the table of the tire changing machine when a tire tool is engaged therewith, i.e., are adapted to rotate the centerpost only clockwise or counterclockwise during mounting or demounting, but not both. This, of course, means that the tire tool itself (the mounting head of the tool if a tire is being mounted onto a wheel, or the demounting head of the tool if the tire is being demounted from a wheel) can rotate in one direction only relative to the table of the tire changing machine. This unidirectional rotation of prior art centerpost drive mechanisms oftentimes leads to problems in connection with operation of the automatic tire changer machine. Such problems arise when either the tire tool's mounting head or demounting head (depending on which is in use at the time) becomes bound or hung up or jammed between the tire's bead and the wheel's rim during its rotation.

The jamming or binding referred to oftentime causes the tire tool and the centerpost to come to an absolute stop. This stoppage during rotation of the tool occurs because of under capacity of the centerpost's power unit under such high load conditions. Common operator practice to overcome this jamming or binding problem involves the step of beating on the tire tool with a mallet or hammer to aid the tool's head in completing its single revolution around the wheel and, hence, mounting of the tire's bead onto or demounting of the tire's bead from the wheel. Needless to say, such a practice results in major abuse to the tool and to the tire, as well as to the centerpost drive mechanism of the automatic tire changer machine.

The tendency of the tire tool's mount or demount head to become bound or hung up between the tire's bead and the wheel's rim also creates a safety problem to the operator. Oftentimes it occurs that, instead of being jammed or hung up to the point where the tire tool totally stops in its rotation, the tool simply meets a higher than normal degree of resistance which it is able to overcome during its rotation. Thus, this tendency of the tool's head to bind or hang up may well cause the tool to whip or move spasmodically in its rotational path unless the tire tool is stopped entirely in its rotational path. This whipping of the tire tool is caused by the centerpost power unit's reaction to the resistance met by the tire tool as it starts to hang up during its rotational path. If an operator's arm or hand is adjacent to the tire tool's head as the tool whips away from a temporary hang up, the blow to the hand could provide a nasty bruise or worse to the operator.

A further disadvantage of one-way prior art centerpost drive mechanisms is that same must be returned to a start or home position prior to mounting successive beads over a wheel's rim. That is, since the drive mechanism is adapted to rotate the centerpost in one direction only, the centerpost must be returned to its home position after each bead mounting cycle prior to commencement of a subsequent cycle. This of course, decreases the efficiency of the machine since it decreases the number of tires that may be processed per unit of time by an operator.

Therefore, it has been one objective of this invention to provide a novel centerpost drive mechanism for an automatic tire changer machine which is fluid powered, and which is adapted to rotate the centerpost in a positive manner in either the clockwise or counterclockwise direction as selected by the operator in charge of the machine when the tire tool is engaged therewith during mounting or demounting of a tire with a wheel. This allows the tire tool's mount or demount head to be reversed under power if that head becomes bound or hung up during use, thereby freeing the head through use of the drive mechanism. Further, this allows the machine's operator to mount a tire's first bead over the wheel's rim in one rotational direction and then mount the tire's second bead over the wheel's rim in the reverse rotational direction, thereby precluding the necessity of returning the drive mechanism to a single home position before mounting successive beads.

It has been another objective of this invention to provide a novel centerpost drive mechanism for an automatic tire changer machine as described in the paragraph above where the drive mechanism includes dashpot means which function to at least partially control the rate of rotational motion for the centerpost. This substantially reduces the tire tool's tendency to whip or move spasmodically in its rotational path if the tool's working head becomes momentarily hung up or jammed between the tire's bead and the wheel's rim during use.

These objectives have been obtained in the improved centerpost drive mechanism for an automatic tire changer of this invention. The improved drive mechanism includes a rotatable centerpost that extends vertically upward through the machine's horizontally disposed wheel support table, the centerpost mounting a pinion beneath the table that is interengaged with a linear rack. The rack is transversely oriented relative to the centerpost and is directly connected with a fluid power unit, the power unit being adapted to drive the rack in both forward and reverse directions, thereby positively driving the centerpost in both clockwise and counterclockwise directions. At least one shock absorber is interconnected between a fixed location and the rack, the shock absorber functioning to at least partially control the rate of rotational motion for the centerpost (when extending the rack as well as when retracting the rack) regardless of the work load on the power unit. The drive rack/power unit/shock absorber combination is provided in modular form so that a new such unit may be easily replaced for an inoperative unit in the automatic tire changer machine without the use of skilled labor.

Figure 2:
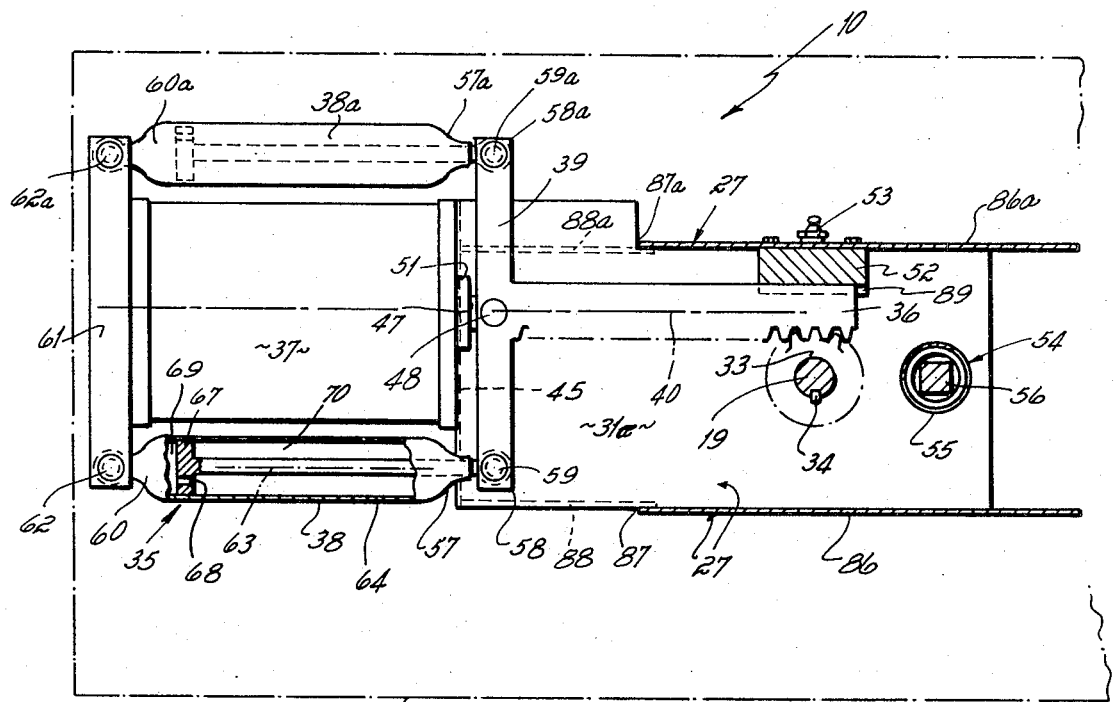

Other objectives and advantages of this invention will be more apparent from the following detailed description taken in conjunction with the drawings in which:

FIG. 1 is a partially broken away side view of an automatic tire changer illustrating the improved centerpost drive mechanism of this invention; and FIG. 2 is a partially cut away top view taken along line 2—2 of FIG. 1.

The improved centerpost drive mechanism 10 of this invention is illustrated in its structural environment in FIG. 1. As shown in that FIG. 1, the improved centerpost drive mechanism 10 is structurally integrated with an automatic tire changer machine 11.

The automatic tire changer machine 11 includes a horizontally disposed table 12 adapted to receive a wheel 13 having a pneumatic tire 14 mounted thereon during use. The wheel 13 is held in fixed position on the table by a hold-down cone 15, the hold-down cone being threadedly engaged with exteriorly threaded (as at 16) cylinder 17. The cylinder 17 is immobily mounted to the table 12 by collar 18. The table 12 itself is supported on the machine's main frame 27, the main frame being enclosed by shroud 30.

A centerpost 19 extends vertically upward from beneath the table 12 to a terminal point above the wheel 13. The rotatable centerpost 19 is coaxially and interiorly located relative to the fixed threaded cylinder 17. The outside diameter of the centerpost 19 is sized relative to the inside diameter of the threaded cylinder 17 so that the centerpost can easily rotate therein. the upper end of the centerpost 19 is provided with a flatted portion 20 adapted to be engaged by the slotted body section 21 of a mount/demount tire tool 22 so that rotation of the centerpost is translated into rotation of the tire tool. The tire tool 22 is angulated relative to the centerpost 19 so that either the mount 23 or demount 24 head (depending on whether the tire is being mounted onto or demounted from the wheel 14) can be cooperatively engaged with the tire's bead area 25 and wheel's rim 26. A mount/demount tire tool 22 particularly adapted for use with the automatic tire changer 11 is illustrated in U.S. Pat. application Ser. No. 328,010 entitled MOUNTING HEAD FOR A TIRE TOOL, invented by Donald D. Rainey, filed simultaneously herewith. The advantages of clockwise and counterclockwise rotation of the tire tool 22 about the centerpost 19 are explained in that application.

In use, the wheel's center hole 28 is coaxially disposed about the centerpost 19, the hold-down cone 15 being located in locking engagement with the wheel as the cone is screwed toward the table's surface 29. The slotted body portion 21 of the tire tool 22 is then engaged with the flatted portion 20 of the centerpost 19, and either the mount 23 or demount 24 head is engaged with the tire's bead 25 and the wheel's rim 26 depending on whether the tire is to be mounted onto or demounted from the wheel's rim, respectively (as shown in FIG. 1 the tire tool's mount head 23 is in operative engagement with the tire's bead 25 and the wheel's rim 26 so as to mount the tire onto the wheel). The centerpost 19 is then caused to rotate either clockwise or counterclockwise as desired by the operator for the purpose of mounting the tire 14 onto, or demounting the tire from, the wheel 13. The clockwise or counterclockwise rotation of the centerpost 19 is introduced into the centerpost by the improved centerpost drive mechanism 10 of this invention.

The improved centerpost drive mechanism 10 includes the centerpost 19, the centerpost being perpendicularly oriented relative to the horizontal surface 29 of the table 12. The centerpost 19 is mounted to the machine's main frame 27 at its lower end portion between opposed plates 31, 31a, each of the plates 31 mounting a bearing block 32 which receives the centerpost. The plates 31 are welded between opposed side walls 86, 86a of the main frame 27. Thus, the centerpost 19 is supported for rotation at spaced locations adjacent its lower end portion by means of the two bearing blocks 32, and is supported for rotation adjacent its upper end portion by virtue of passing through threaded cylinder 17. The centerpost 19 carries a pinion gear 33 between bearing blocks 32, the pinion gear being positively and immobily located on the centerpost by key 34, see FIG. 2.

A modular power unit 35 is fixed to the plates 31, 31a of the machine's main frame 27 to cooperate with the centerpost's pinion gear 33, (the plates 31, 31a extending beyond the edges 87, 87a of the main frame's side walls 86, 86a, and being supported beyond those edges 87, 87a by gussets 88, 88a welded to the plates 31, 31a and the side walls 86, 86a). The power unit 35 includes a straight rack 36, fluid motor 37, and a pair of shock absorbers 38, see FIG. 2.

Note that the linear rack 36 is oriented transverse to the centerpost 19, i.e., the linear rack is adapted to reciprocate in a horizontal plane and the centerpost is adapted to rotate about a vertical axis. The linear rack 36 is fixed to a crossbar 39 oriented transverse to the rack's axis, thereby providing an essentially T-shaped rack. Bearing pad 52 is fixed to the main frame's side wall 86a adjacent the centerpost 19, the bearing pad serving to maintain the rack 36 in engagement with the centerpost's pinion gear 33 during operation of the drive mechanism 10. Grease fitting 53 is provided to grease the throat 89 of the bearing pad 52 since the rack 36 reciprocates through that throat.

The fluid motor 37 is a pneumatic motor (although it may be a hydraulic motor, if desired). The pneumatic motor 37 includes a piston head 41 captured inside housing 42, thereby dividing the housing into chambers 43 and 44. The motor housing 42 is bolted to flanges 45 of plates 31, 31a of the machine's main frame 27 at spaced locations around its periphery by means of through-bolts 46. Thus, the motor 37 is fixed to the machine's main frame 27 and piston shaft 47 is adapted to extend and retract in response to the pneumatic pressure within chamber 43 or 44 defined in the housing 42. The rack's crossbar 39 is interconnected with the motor's piston shaft 47 by means of a headed pin 48 that slips through mating holes in the crossbar and the piston rod when the piston rod's end 49 is located in crossbar's bore 50 as shown in FIG. 1. Note that the motor's piston shaft 47 is essentially coaxial with the linear rack 36, the motor 37 thereby imparting a straight or direct line thrust to the rack and producing maximum mechanical energy transfer from the penumatic motor to the rack. Seal 51 maintains the pneumatic integrity of chamber 44 as the shaft 47 alternately extends from and retracts into motor housing 42.

A shock absorber 38 is interconnected between the motor housing 42 (which is a fixed location) and the rack's crossbar 39 (which reciprocates with the rack 36) on each side of the pneumatic motor 37. Each shock absorber 38, 38a is pivotally connected at end 57, 57a to crossbar extremities 58, 58a by a headed pin 59, 59a, and at end 60, 60a to housing brace 61 by a headed pin 62, 62a. Each shock absorber includes a housing 64 (which is pivotally mounted to the crossbar 39) and a piston head 67, the piston head being provided with a bleed hole 68 so as to connect the two chambers 69, 70 defined by the head 67 within the housing 64. Oil is captured within the chambers 69, 70, the oil bleeding from one chamber 69 to the other chamber 70 through the bleed hole 68 as the rack 36 is alternately extended and retracted in response to the motor 37 so as to provide a controlled, stable linear motion for the rack and, therefore, a controlled, stable rotational motion for the centerpost 19. Note that the shock absorbers 38, 38a are located in substantially the same horizontal plane as the rack 36, and that each shock absorber's working axis 63 is parallel relative to the rack's reciprocation axis 40 (which is the same as the motor's axis). Further, note particularly that the piston's connecting rod 47 with the rack 36 is coaxial with the rack's reciprocation axis.

The fluid motor 37 is preferably pneumatically operated since automatic tire changer machines are most often located in independent gasoline stations or in independent tire shops where air pressure is readily available; in this regard, note the pneumatic circuit shown in FIG. 1. A separate spring loaded three-way valve 73, 74 (each having two positions, namely, a vent position and a pressure position) is interconnected with each chamber 43, 44 of the pneumatic motor 37, valve 73 being connected to chamber 43 through port 81 and line 82, and valve 74 being connected through port 83 and line 84. Each three-way valve 73, 74 includes a source port 75 suitably connected by a line 71 to an air pressure source 72, and a vent port 76 adapted to open to atmosphere. The three-way valves 73, 74 are both spring 77 loaded toward the vent port 76, i.e., unless otherwise actuated the valves are always open to atmosphere. Each three-way valve 73, 74 is operable by means of a foot pedal 78, 79 located adjacent the base 90 of the machine's frame 27 and interconnected by shaft 85 with its respective valve, the foot pedals being readily acessible to the machine's operator. Foot pedal 78/three-way valve 73 is operable to effect clockwise rotation of the centerpost 19, and foot pedal 79/three-way valve 74 is operable to effect counterclockwise rotation of the centerpost, thereby providing separate foot-operated control means to effect either clockwise or counterclockwise rotation of the centerpost as desired by the operator.

A latching device 54 is provided to cooperate with the centerpost drive mechanism 10 so as to prevent rotation of the wheel 13 (and, hence, of the tire) when the wheel is mounted on the table 12 by hold-down cones 15. Such rotation of the wheel 13 may be induced by the frictional forces generated between the tool's mounting or demounting head when in operative engagement with the wheel's rim 26 and tire's bead 25, the tendency being for the wheel to be rotated in the same direction as the centerpost and tool because of those frictional forces when the centerpost drive mechanism 10 is energized.

The latching device 54 includes a spring 55 loaded arm 56 that is substantially vertically oriented and that is pivotable to a limited extent about axis 92. The arm 56 extends up above the table 12 through slot 94 in the table, and terminates in a finger 65 adapted to be received in any lug hole in the wheel's center web 91. The arm 56 also extends down between the main frame's plates 31, 31a, plate 31 defining a slot 93 that limits the extent of the arm's pivotal motion about axis 92. The upper edge of spring 55 bears against pin 66 fixed to the arm 56, and the lower end of spring 55 bears against the lower plate 31a of the main frame 27, thereby continuously biasing the arm in a substantially vertically upward direction. Pin 80 at the lower end of the arm 56 acts as a limit stop to limit upward movement of the arm during those intervals when no wheel 13 is positioned on the machine's table 12, pin 80 bearing against the underside of plate 31a during those intervals. In use, rotational movement of the wheeel 13 about the centerpost 19 on the table 12 is prevented when the arm's finger is interengaged with the wheel's lug hole. This for the reason that the arm 56 is only permitted vertical motion as induced by spring 55 (as opposed to rotational motion about the centerpost 19), because slots 93 and 94 in the plate 31 and table 12, respectively, prevent the undesired rotational motion.

In use, and when it is desired to rotate the centerpost 19 clockwise, the operator depresses foot pedal 78 with his foot; this biases three-way valve 73 against its spring 77 loading to interconnect motor chamber 43 with high pressure air through the valve's source port 75. When high pressure air is introduced into motor chamber 43, piston head 41 is forced toward the right (as shown in FIGS. 1 and 2), thereby causing the rack 36 to extend toward the right. This, of course, provides a positive drive, clockwise rotation for the centerpost 19. Air pressure in motor chamber 44 during extension of the rack 36 is exhausted through the three-way valve 74 to atmosphere since same remains spring 77 loaded to vent port 76 when only foot pedal 78 is depressed.

Counterclockwise rotation of the centerpost 19 is accomplished by the operator by first releasing the clockwise pedal 78, and then depressing the counterclockwise pedal 79. Release of the clockwise pedal 78 automatically translates the three-way valve 73 into the vent port 76 attitude because of the spring 77 loading, and depressing the counterclockwise pedal 79 translates the three-way valve 74 into the source port 75 attitude. This introduces high pressure air into motor chamber 44, thereby driving the piston head 41 to the left as illustrated in FIG. 2, and as a result, also retracting the rack 36 toward the left. This, of course, provides a positive drive, counterclockwise rotation for the centerpost 19. The air in motor chamber 43 is exhausted to atmosphere through the three-way valve 73 since same is in the vent port 76 attitude because of spring 77 loading.

The ability of the centerpost drive mechanism to rotate the centerpost 19 either clockwise or counterclockwise, as selected by the operator, allows the tire tool's mount or demount head to be reversed under full power if the head in use becomes bound or hung up, thereby mechanically freeing the head through use of the drive mechanism. Further, this allows the machine's operator to mount the tire's first bead over the wheel's rim in one rotational direction and then mount the tire's second bead over the wheel's rim in the other rotational direction, thereby precluding the necessity of returning the drive mechanism to a single home position time after time before mounting successive beads.

During use of the pneumatic motor 37 (as controlled by foot pedals 78, 79), the shock absorbers 38, 38a, in effect, function as a dashpot to control the linear extension or retraction rate of the rack 36 in both extension and retraction directions. That is, the shock absorbers 38, 38a provide a controlled rate of motion for the rack 36 over its travel length, both in the extension direction and the retraction direction, regardless of the energy load on the rack as provided by the motor 37. Such is quite important under those circumstances where, e.g., the tire tool's mounting 23 or demounting 24 head becomes bound or hung up between the tire's bead 25 and a wheel's rim 26 as the tire 14 is being mounted onto or demounted from the wheel 13. In such instances the tool 22 may all of a sudden "break loose" because of a pressure buildup within the pneumatic motor 37 and, thereby, cause the tool to whip over a limited circumferential path because of that high pressure buildup. This, of course, presents a safety hazard to the machine's operator as discussed above. The shock absorbers 38, 38a, in effect, prevent rack 36 overspeed and, thereby, prevent whipping of the tool 22, as the shock absorbers damp out any sudden linear motion of the rack due to a high pressure buildup within the high pressure chamber of the motor 35 which has occurred in response to binding or hanging up of the tool between the tire's bead and the wheel's rim.

Note particularly that this improved drive mechanism is a modular unit that can be easily removed from the machine's main frame 27 simply by removing the four through bolts 46 that hold same in place. This allows the motor 37, shock absorbers 38 and rack 36 to be removed by an unskilled operator for servicing, and allows installation of a new or rebuilt power unit 35 by an unskilled operator.

Having described in detail the preferred embodiment of my invention, what I desire to claim and protect by Letters Patent is:

1. A modular centerpost drive mechanism for an automatic tire changer machine, said mechanism being adapted to rotate a centerpost for a tire mount-/demount tool to aid in mounting a tire onto and demounting a tire from a wheel, said mechanism including
   a rack adapted to drivingly engage a pinion fixed to said centerpost,
   a double acting fluid power unit connected to said rack, said power unit being adapted to drive the rack in a positive manner in both forward and reverse directions so as to positively drive said centerpost in both clockwise and counterclockwise directions under an operating workload,
   at least one dashpot device connected at one end to said rack and at the other end to said power unit, said dashpot device serving to at least partially control the rates of rotation of said centerpost in both the clockwise and counterclockwise directions regardless of the workload provided to said rack by said power unit, and
   fastening means adapted to mount said drive mechanism to said tire changer machine, said fastening means being easily operable to allow removal of said drive mechanism from operative engagement with said machine in modular fashion.

2. A centerpost drive mechanism as set forth in claim 1
   wherein said rack is linear and is oriented transverse to said centerpost,
   wherein said power unit provides an in-line thrust to said rack, and
   wherein said dashpot device includes two shock absorbers, said shock absorbers being disposed on opposite sides of said power unit, said shock absorbers further being positioned axially parallel to said rack and in a plane that includes said rack.

3. A centerpost drive mechanism as set forth in claim 2 including
   a lubricatable bearing pad fixed to the tire changer machine's main frame, said pad serving to maintain said rack in operative engagement with said centerpost's pinion throughout the length of its thrust when said drive mechanism is in operative engagement with said machine.

4. A centerpost drive mechanism as set forth in claim 2 wherein said fluid power unit is in the nature of a pneumatic motor, and wherein each of said shock absorbers includes a piston head reciprocable within a closed housing, each piston head having bleed ports that allow communication of one chamber within each said housing with the other chamber.

5. A centerpost drive mechanism as set forth in claim 2 wherein each of said shock absorbers is pivotally mounted to said rack at one end and pivotally mounted to said power unit at the other end, thereby promoting the useful life of said shock absorbers.

6. A centerpost drive mechanism as set forth in claim 1 wherein said fluid power unit is a pneumatic motor having two subchambers, each subchamber of said pneumatic motor being interconnectable with an air pressure source by a high pressure line and each of said lines having a spring loaded two-position valve disposed therein that is vented to atmosphere unless otherwise actuated by the machine's operator.

7. A centerpost drive mechanism as set forth in claim 6 wherein each of said valves also includes a foot pedal connected therewith, the machine's operator depressing a first foot pedal when a clockwise rotation of the centerpost is desired and depressing a second foot pedal when counterclockwise rotation of the centerpost is desired.

* * * * *